Sept. 24, 1929.  F. J. WOOD  1,729,199

SPREADER ATTACHMENT FOR THRASHING MACHINES

Filed July 10, 1928

Inventor.
Franz J. Wood
by Orwig & Hagues, Att'ys.

Patented Sept. 24, 1929

1,729,199

UNITED STATES PATENT OFFICE

FRANZ J. WOOD, OF DES MOINES, IOWA

SPREADER ATTACHMENT FOR THRASHING MACHINES

Application filed July 10, 1928. Serial No. 291,504.

This invention relates to improvements in thrashing machines, and particularly that type in which the cylinder concaves are mounted above the cylinder.

In this type of thrashing machines a considerable difficulty is experienced in that the straw is driven downwardly onto the separating racks and concentrated on the center rack more than on the side racks.

It is, therefore, the object of my invention to provide a simple, durable and inexpensive means whereby the straw delivered from the cylinder will be distributed in a quite uniform manner over the separating racks.

My invention consists in the construction, arrangement and combination of the various parts of the device, whereby the objects contemplated are attained, as hereinafter more fully set forth, pointed out in my claims, and illustrated in the accompanying drawings, in which:

Figure 2:
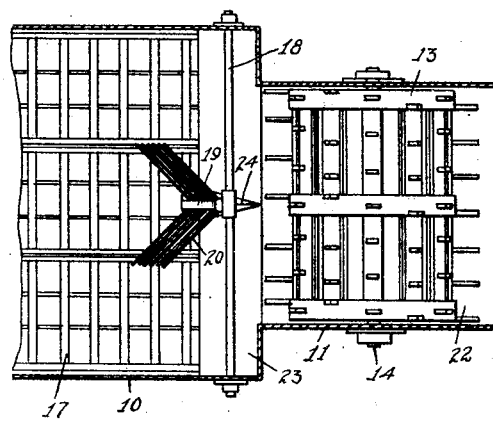
Figure 2 is a detail sectional view taken on the line 2—2 of Figure 1.

The numeral 10 indicates a thrashing machine body, the forward end of which is provided with a cylinder casing 11, which is of less width than the width of the thrashing machine body, as illustrated in Figure 2. The rear end of the casing 11 is provided with an opening 12 through which the straw from the cylinder 13 may be delivered. Said cylinder 13 is mounted on a suitable shaft 14, which in turn is rotatively mounted in the frame of the casing 11 in the usual manner.

Supported above the cylinder 13 is a set of concave tooth-supporting plates 15, having downwardly extending teeth 16. The concave plates 15 and the teeth 16 are of the usual construction. The concaves 15, however, are placed above the cylinder instead of beneath it, as is the usual practice.

I find that in thrashing short grain such as delivered to the thrashing machine by a header a considerable advantage is gained by placing the concaves above the cylinder, so that the straw and thrashed grain from said cylinder may be delivered downwardly and rearwardly onto the separating racks 17 at a point near the forward end of said racks, so that the length of the thrashing machine may be considerably shortened.

A considerable difficulty, however, is experienced in this type of thrashing machines, due to the fact that the cylinder is fed heavier near its central portion, and consequently the thrashed straw and grain therein are delivered to the central portion of the racks 17. It is very desirable that the straw be quite uniformly placed on said racks. To accomplish this, I have provided in the forward end of the thrashing machine body 10 a transversely arranged shaft 18 rotatively mounted in the side members of said frame, and at a point substantially in horizontal alinement with the top surface of the cylinder 14. The shaft 18 is mounted a slight distance back of the upper edge of the opening 12.

Figure 1:
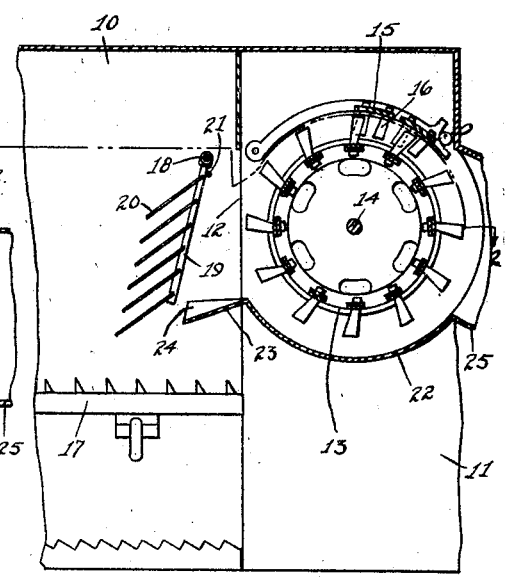
Figure 1 is a longitudinal sectional view of the forward end of a thrashing machine and the cylinder casing, showing the manner in which my improved device is applied.

The central portion of the shaft 18 is provided with a downwardly and rearwardly extending spreader bar 19. Each of the side edges of the bar 19 has a series of outwardly extending and spaced rods 20, said rods also extending downwardly and rearwardly. A pin 21 limits the forward movement of the lower end of the bar 19 with the said bar in a slightly inclined position, as illustrated in Figure 1.

Beneath the cylinder 14 is a curved plate 22, the rear edge of which terminates in a downwardly and rearwardly extending plate 23. The central portion of said plate 23 has a spreader member 24 having inclined triangular faces, having their apex ends extending forwardly in the manner illustrated in Figures 1 and 6. The rear end of the member 23 is substantially beneath the lower end of the bar 19.

The forward edge of the plate 22 terminates in a downwardly and forwardly extending member 25 to which a feed conveyor may be attached if so desired.

Figure 3:
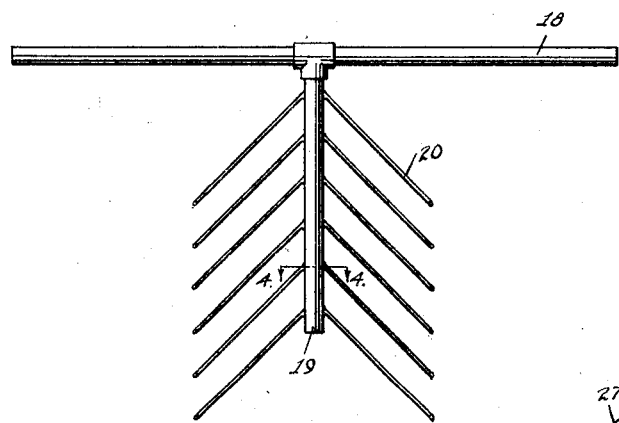
Figure 3 is a rear view of one of the spreader members.
Figure 4:
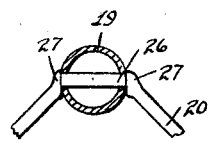
Figure 4 is a detail sectional view taken on the line 4—4 of Figure 3.
Figure 5:
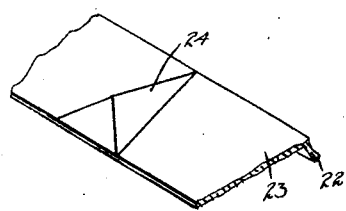
Figure 5 is a perspective view of a segmental portion of another member of the spreading device.

The rods 20 are supported in the tubular bar 19 in the manner clearly illustrated in Figure 4. The rods 20 are extended through suitable opening 26 in the tubular bar 19, after which the inner ends of the outwardly extending portions are swelled or upset, so that bulged portions 27 are formed to support the rods in position. Said rods extend rearwardly and downwardly and laterally in opposite directions, as clearly shown in Figures 1, 2 and 3, in such a manner that as straw is delivered from the cylinder 14, it will be engaged by the formed edge of the bar 19 and the rods 20, a portion of which will be delivered outwardly to the outer edges of the racks 17, while the remaining portion will travel beneath the lower end of the bar 19.

On account of the bar 19 being pivotally connected at its upper end, it will be seen that the lower end of said bar may swing rearwardly to accommodate the variation in the feed or bunches of straw of various thicknesses.

The member 24 also throws the shorter pieces of straw, together with the thrashed grain, outwardly, so that the said smaller particles of thrashed grain will be evenly distributed over the separating racks.

On account of the rods 20 extending downwardly and rearwardly, all tendency toward tangling is eliminated. The inclination of said rods also directs the straw downwardly.

Thus it will be seen that I have provided a separating device of simple, durable and inexpensive construction, which is rigid and positive in its operation and sensitive to the various working conditions to which it is subjected, and which is very efficient for the purpose for which it is intended.

By spreading the straw uniformly over the separating racks, the speed of the separation is thereby increased in a given size thrashing machine. This is an important feature in the portable type of thrashing machines, which are adapted to thrash while the machine is being advanced over the ground surface.

I claim as my invention:

1. In combination, a thrashing machine frame having a cylinder casing at one end, and an opening communicating with said casing, a cylinder in said casing, cylinder concaves mounted above said cylinder, and means supported in said frame back of said opening to spread material delivered by said cylinder through said opening downwardly and outwardly into said thrashing machine frame.

2. In combination with a thrashing machine having substantially horizontal separating racks and a cylinder supported above and in front of said racks adapted to deliver material downwardly onto said racks, and means supported back of the central portion of said cylinder for spreading a portion of said material downwardly and laterally in both directions.

3. In combination with a thrashing machine having substantially horizontal separating racks, and a cylinder in said casing adapted to deliver material downwardly on the forward ends of said racks, said cylinder having concaves mounted above its upper surface, and means back of the central portion of said cylinder for spreading a portion of said material downwardly and laterally in both directions onto said racks.

4. In combination with a thrashing machine having a cylinder therein adapted to deliver material downwardly and rearwardly, and means back of the central portion of said cylinder for spreading a portion of said material downwardly and laterally in both directions.

5. In combination with a thrashing machine having a cylinder therein adapted to deliver material outwardly and rearwardly, and an upwardly and forwardly inclined bar having its upper end pivoted at points substantially in alinement with the upper surface of said cylinder, each side of said bar having a series of laterally projecting and spaced rods inclined rearwardly and downwardly.

6. In combination with a thrashing machine having a cylinder therein adapted to deliver material outwardly and rearwardly, and an upwardly and forwardly inclined bar having its upper end pivoted at points substantially in alinement with the upper surface of said cylinder, each side of said bar having a series of laterally projecting and spaced rods inclined rearwardly and downwardly, and a curved plate beneath said cylinder, the rear edge of said plate terminating in a rearwardly and downwardly extending portion.

7. In combination with a thrashing machine having a cylinder therein adapted to deliver material outwardly and rearwardly, and an upwardly and forwardly inclined bar having its upper end pivoted at points substantially in alinement with the upper surface of said cylinder, each side of said bar having a series of laterally projecting and spaced rods inclined rearwardly and downwardly, and a curved plate beneath said cylinder, the rear edge of said plate terminating in a rearwardly and downwardly extending portion, the central portion of said downwardly and rearwardly extending portion being provided with a spreader block having inclined triangular faces, the apex end of said block extending forwardly and upwardly.

8. In combination with a thrashing machine having a cylinder therein adapted to deliver material downwardly and rearwardly, and provided with overhead concaves, a concave plate beneath the cylinder, the rear edge of said plate extending downwardly and rearwardly, the central portion of said plate being provided with an upwardly projecting spreader member adapted to spread material laterally and rearwardly.

Des Moines, Iowa, June 23, 1928.

FRANZ J. WOOD.